Dec. 23, 1952 — H. A. ADAMS — 2,623,187
MAGNETIC IMPULSE MOTOR
Filed Jan. 19, 1948 — 2 SHEETS—SHEET 1
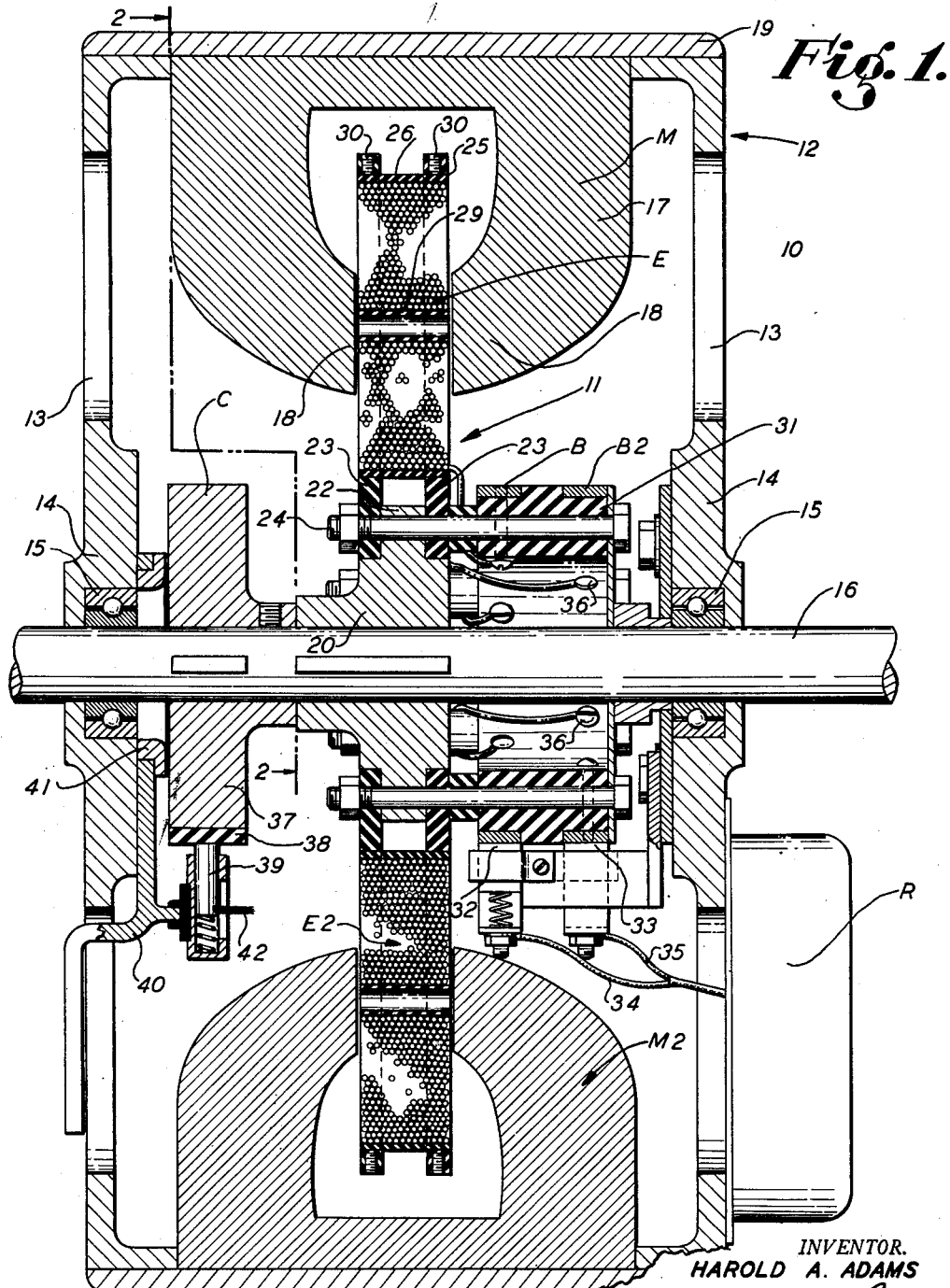
Fig. 1.
INVENTOR.
HAROLD A. ADAMS
BY 
ATTORNEY Dec. 23, 1952          H. A. ADAMS          2,623,187
MAGNETIC IMPULSE MOTOR
Filed Jan. 19, 1948                        2 SHEETS—SHEET 2
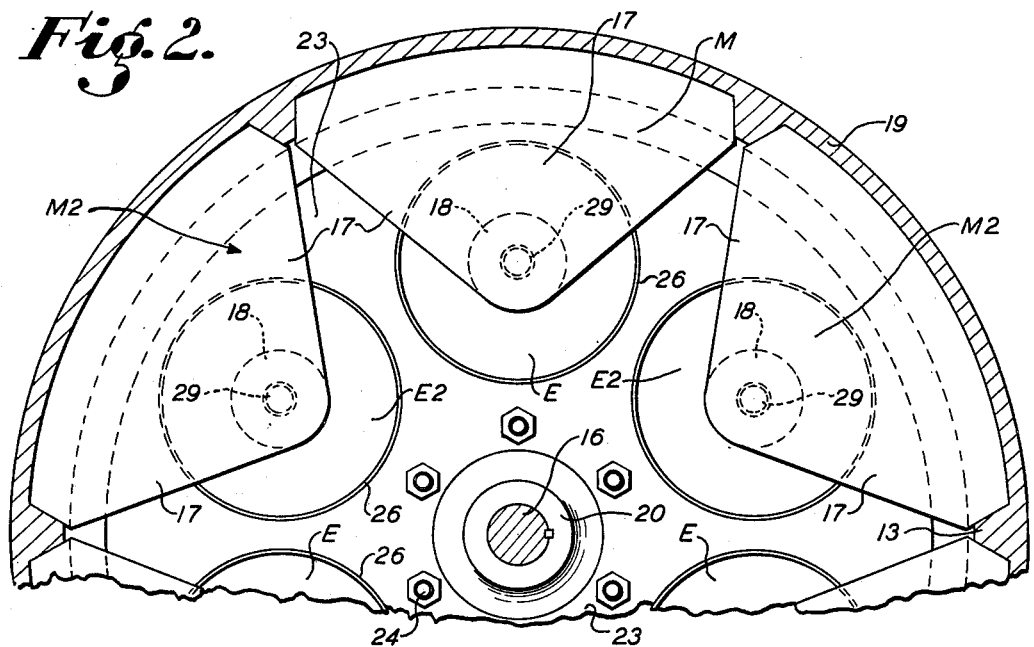
Fig. 2.
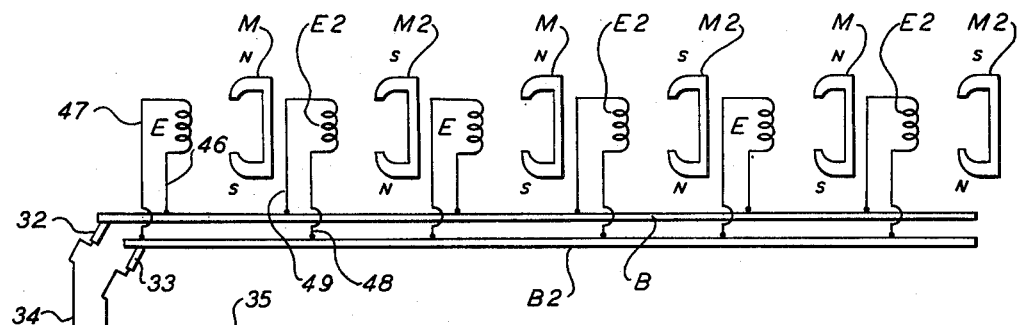
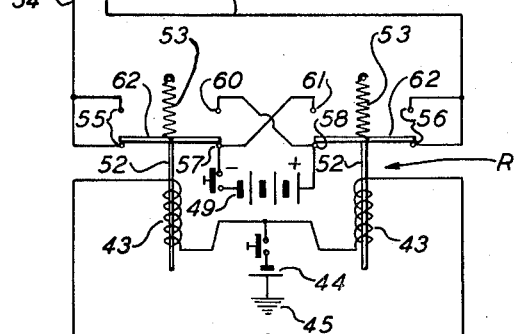
Fig. 3.
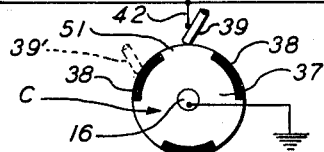
INVENTOR.
HAROLD A. ADAMS
BY Jesse P. Whann
ATTORNEY Patented Dec. 23, 1952

2,623,187

UNITED STATES PATENT OFFICE 2,623,187

MAGNETIC IMPULSE MOTOR

Harold A. Adams, Isabella, Calif., assignor, by direct and mesne assignments, to Latent Energy Motor Corporation Application January 19, 1948, Serial No. 3,129

4 Claims. (Cl. 310—154)

My invention relates in general to electric motors, and relates in particular to an electric motor which utilizes the latent energy of permanent magnets.

It is an object of the invention to provide an electric motor having a pair of relatively rotatable members, one of these members being the rotor and the other being the stator of the motor. One of these relatively rotatable members has thereon permanent magnets arranged in an especial manner to cooperate with the solenoids carried by the other of said relatively rotatable members.

It is a further object of the invention to provide an electric motor of the character set forth in the preceding paragraph having commutator means and an arrangement of connections whereby direction of rotation of the motor may be reversed.

A further object of the invention is to provide an electric motor of this character, wherein the permanent magnets are alternated with respect to the polarity thereof, and means are provided for alternating the polarities of the electromagnets in a manner to produce relative rotation of the relatively rotatable members.

A further object of the invention is to provide an electric motor wherein both attraction and repulsion forces are utilized to fullest extent between the permanent magnets and the solenoids.

A further object of the invention is to provide an electric motor having members in relatively rotatable relation, one of these members supporting a plurality of so-called horseshoe magnets disposed so that the spaced poles of these magnets define a circular path, the other of these members of the motor having a plurality of electro-magnetic members disposed in this circular path. In the invention, the horseshoe magnets are alternated with respect to polarity, the result being that when the electromagnetic members are energized, they will be each attracted by one permanent magnet and repelled by another permanent magnet.

It is a further object of the invention to provide a motor of this character having means for starting the same in either direction of rotation.

Further objects and advantages of the invention will be brought out in the following part of the specification, wherein I have described in detail a single embodiment of the invention for the purpose of disclosing the invention without placing limitation on the scope of the invention which is set forth in the appended claims.

Referring to the drawings which are for illustrative purposes only,

Fig. 1 is a vertically sectioned view of a preferred embodiment of my invention, the plane on which this view is sectioned corresponding to the longitudinal axis of the motor.

Fig. 2 is a fragmentary cross sectional view taken substantially as indicated by the line 2—2 of Fig. 1.

Fig. 3 is a schematic view or electrical diagram of the electrical parts of the motor.

As shown in Figs. 1 and 2, the motor comprises parts 10 and 11 disposed in rotatable relation. In the form of the invention shown, the part 10 is the stator and the part 11 is the rotor. These parts 10 and 11 include permanent magnets M and M2 and electromagnetic means E and E2 consisting of solenoids which differ from electromagnets in that they do not have iron cores therein. It will be understood that the terms "electromagnetic means" and "electromagnet" are used in the broad meaning of means wherein magnetism is produced electrically by use of a coil of wire through which an electric current is conducted, and in some practices of the invention, the parts may be reversed. That is to say, the solenoids may be part of the stator and the permanent magnets may be part of the rotor structure.

The stator 10 comprises a frame 12 consisting of end members 13 having hubs 14 to hold ball bearings 15 by which a shaft 16 is rotatably supported. The magnets M and M2 are of the so-called horseshoe type provided with legs 17 having inwardly turned ends 18 to provide pole pieces in facing and spaced relation. These magnets M and M2 are supported by a circumferential wall which is secured to peripheral portions of the stator frame members 13. The magnets M and M2 are disposed in circular arrangement and substantially equally spaced so that the pole parts 18 define a circular path concentric with the axis of the shaft 16. As shown in Fig. 2, the magnets M and M2 have the legs 17 thereof enlarged outwardly from the end parts 18 thereof so as to provide massive bodies of metal in each of the magnets M and M2, providing large sources of permanent or residual magnetism, concentrated as it passes from one of the pole pieces 18 to the other.

The rotor 11 comprises a hub 20 which is fixed on the shaft 16, this hub having a flange 22 carrying a pair of circular plates 23 of non-magnetic insulating material, radially disposed and in spaced relation so that portions of these plates lie between the pole pieces 18 of the magnets M and M2. The plates 23 are secured to the flange 22 by means such as bolts 24. The plates 23 are provided with aligned openings 25 which receive the ends of tubes 26 of insulating material in which the solenoids E and E2 are supported. The windings constituting the solenoid coils E and E2 wound on insulator tubes 29 are completely impregnated with baked insulating material. The axes of the tubes 29, and therefore the solenoids E and E2, are spaced radially outwardly from the shaft 16 the same distance as the centers of the pole parts 18 of the permanent magnets M and M2. Therefore, during the revolution of the rotor 11, the magnetic axes of the solenoids E and E2 periodically coincide with the magnetic axes of the permanent magnets M and M2. Even numbers of permanent and electromagnets are employed. In the present embodiment of the invention, I have shown six permanent magnets and six solenoids E and E2 and have shown set screws 30 for holding the solenoids E and E2 in the openings 25 of the plates 23.

The bolts 24 carry a cylindric body of insulating material 31 which supports collector rings or circular bus bars B and B2 which are engaged by brushes 32 and 33 connected respectively by conductors 34 and 35 with a reversing switch mechanism R, the details of which are shown in the electrical diagram, Fig. 3. Screws 36 pass radially through the cylindrical insulator body 31 to make contact with the bus bars B and B2, and the inner ends of these screws 36 are connected to the solenoids E and E2 by conductors 46, 47, 48 and 49, as shown in detail in Fig. 3.

On the leftward portion of the shaft 16, Fig. 1, a commutator C is mounted, this commutator comprising a circular metal body 37 which is grounded to the shaft 16 and which carries in recesses in its circumferential face insulators 38. A brush 39 is carried by a lever member 40 supported by a circular flange 41 so as to be rotatable around the axis of the shaft 16 and thereby movable so as to adjust the brush 39 along the circumferential face of the commutator C. A conductor 42 connects the brush 39 with the reversing switch mechanism R as shown in Fig. 3.

The reversing switch R includes electromagnetic means 43 shown as solenoids connected in parallel with a source of electric current shown as a battery 44, one terminal of which is connected to ground by a ground connection 45. When the brush 39 is in contact with a metal segment 51 of the commutator C, as shown in Fig. 3, the solenoids 43 will be energized and armatures 52 will be pulled downwardly against the lifting force of springs 53, when the commutator or drum switch C rotates so as to bring one of the insulator segments 38 thereof under the brush 39, the flow of current through the solenoids 43 will be discontinued, and the springs 53 will lift the armatures 52 from the positions in which they are shown. The reversing switch R includes spaced contacts 55 which are connected to the conductor 34 and spaced contacts 56 which are connected to the conductor 35. It also includes contacts 57 and 58 which are connected to opposite poles of a battery 59, providing a source of current for the operation of the motor. Above the contacts 57 and 58 are contacts 60 and 61 which are cross-connected to the contacts 57 and 58. That is to say, the contact 60 is connected to the contact 58, and the contact 61 is connected to the contact 57. Movable contacts 62 are connected to the armatures 52 so that when the solenoids 43 are energized, the contacts 62 will be pulled down, respectively connecting one of the contacts 55 with the contact 57 and one of the contacts 56 with the contact 58, thereby connecting the negative pole of the battery 59 with the brush 32 and connecting the positive pole of the battery 59 with the brush 33. When the solenoids 43 are de-energized, the springs 53 will raise the movable contacts 62, connecting the upper contacts 55 and 56 with the contacts 60 and 61, respectively, thereby reversing the polarity of the connection of the battery 59 with the brushes 32 and 33, which engage the bus bars B and B2.

In the electrical diagram, Fig. 3, the permanent magnets and the solenoids shown in circular arrangement in Fig. 2, have been arranged linearly. It will be noted that there are three permanent magnets M and three permanent magnets M2, and that the magnets M2 lie between magnets M. The solenoids E are alternated with solenoids E2. These solenoids E and E2 are the same in construction and differ only in the manner of their connection to the bus bars B and B2. It will be noted that the near ends of the solenoids E are connected by the conductors 46 with the bus bar B and that the far ends of these solenoids E are connected by conductors 47 with the bus bar B2. The solenoids E2 are oppositely connected. That is to say, the near ends of these solenoids E2 are connected by conductors 48 with the bus bar B2 and by conductors 49 with the bus bar B. Also, it is a feature of the invention to alternate the poles of the permanent magnets M2. Referring to Fig. 3, the near poles of the permanent magnets M are the south poles and the far poles are north. The permanent magnets M2 are reversed so that the near poles thereof are north and the far poles are south.

The solenoids E and E2 are so wound that the ends thereof which receive negative current will be of north polarity. That is to say, with the brush 39, Fig. 3, in engagement with the metal segment 51, so as to energize the solenoids 43 and pull the movable contact 62 downward, negative current will be fed through the conductor 34 and the brush 32 to the bus bar B and therefore the near ends of the solenoids E will be of north polarity and the far ends of the solenoids E2 will be of south polarity, and the solenoids E will be attracted by the permanent magnets M and the solenoids E2 will be attracted by the electromagnets M2, thereby pulling the solenoids rightwardly from the positions in which they are shown in Fig. 3. When these solenoids E and E2 have moved rightwardly from the positions in which they are shown in Fig. 3 into positions wherein the magnetic axes thereof are aligned with or lie slightly to the right of the magnetic axes of the electromagnets M and M2 respectively, the commutator C will be rotated in counterclockwise direction, so as to bring the insulator segment 38, shown to the left of the brush 39, under the brush 39, thereby breaking the circuit which includes the solenoids 43, de-energizing these solenoids 43, and permitting the springs 53 to lift the movable contact 62 so that the positive pole will be then connected through the conductor 34 and the brush 32 with the bus bar B. The result of this action of the reversing switch R will be to reverse the polarity of the magnetic flux of the solenoids E and E2, causing the solenoids E to be attracted rightwardly by permanent magnets M2, and causing the solenoids E2 to be attracted rightwardly by permanent magnets M. It will be understood that whenever a solenoid is attracted by a permanent magnet lying to one side thereof, it will be repulsed by the electromagnet lying on the opposite side thereof, this being due to the alternation of the poles of the magnets M and M2 as shown and described with relation to Fig. 3, and due to the manner in which the solenoids E and E2 are connected to the bus bars B and B2 so as to be alternately fed with negative current from the battery 49 in the manner described. By use of the handle 40, shown in Fig. 1, the brush 39 may be moved rightwardly or leftwardly a small distance so as to advance or retard the operation of the reversing switch R.

The clockwise operation of the motor has been described in the preceding paragraph. Counterclockwise rotation of the motor may be accomplished by swinging the handle 40 in counterclockwise direction, thereby moving the brush 39 leftwardly from the position in which it is shown in Fig. 3, the brush 39 being thereby brought into engagement with the intermediate portion of the leftward insulator segment 38. At this time, the solenoids 43 will be de-energized, and the movable contacts 62 raised, thereby connecting the bus bar B2 with the negative pole of the battery 49. Accordingly, the far ends of the solenoids E will receive negative current and the near ends of the solenoids E2 will receive negative current, with the result that the solenoids will be attracted leftward from the positions in which they are shown. Thereafter, the rotation of the rotor will be in counterclockwise direction by reason of the reversal of the current through the solenoids E and E2 in such relation to the movement of the solenoids relatively to the electromagnets as to cause the attractive and repulsive magnetic forces to act in a direction to move the solenoids leftwardly.

I claim as my invention:

1. In an electric motor, the combination of: a rotor member and a stator member; an even number of horseshoe permanent magnets on one of said members, said magnets having their pole ends turned inwardly toward each other so as to define magnetic axes and being placed so that their poles will define the opposite sides of a circular path, the poles of consecutive permanent magnets being alternated so that along the side of said path north poles will lie between south poles; a like number of electromagnets mounted on the other of said members so as to lie in said path and with the axes thereof disposed so that at specified times they will be parallel to said magnetic axes of said horseshoe magnets and between the poles of said horseshoe magnets; current source and conductor means for energizing said electromagnets so that the fields of adjacent electromagnets will be of opposite polarity; and means for reversing the polarities of said electromagnets, comprising a reversing switch connecting said current source to said conductor means and means acting as said rotor is rotated to actuate said reversing switch.

2. In an electric motor, the combination of: a rotor member and a stator member; an even number of horseshoe permanent magnets on one of said members, said magnets having their pole ends turned inwardly toward each other so as to define magnetic axes and being placed with their legs extending radially and so that their poles will define the opposite sides of a circular path, the poles of consecutive permanent magnets being alternated so that along the side of said path north poles will lie between south poles; a like number of electromagnets mounted on the other of said members so as to lie in said path and with the axes thereof disposed parallel to the axes of rotation of said rotor and parallel to said magnetic axes of said horseshoe magnets and between the poles of said horseshoe magnets; current source and conductor means for energizing said electromagnets so that the fields of adjacent electromagnets will be of opposite polarity; and means for reversing the polarities of said electromagnets, comprising a polarity reversing relay connecting said current source with said conductor means, said relay having an energizing circuit including a source of electric energy and drum switch means rotating in timed relation to said rotor member for controlling the flow of current in said energizing circuit.

3. In an electric motor, the combination of: a rotor member and a stator member; an even number of permanent magnets on one of said members placed so that their poles will define a circular path, the poles of consecutive permanent magnets being alternated so that along the side of said path north poles will lie between south poles; a like number of coreless solenoids mounted on the other of said members so as to lie in said path; conductor means and a source of electrical energy for energizing said solenoids so that the fields of adjacent solenoids will be of opposite polarity; and means for reversing the polarities of said solenoids, comprising a reversing switch connecting said current source to said conductor means and electrical means acting as said rotor is rotated to actuate said reversing switch.

4. In an electric motor, the combination of: a rotor member and a stator member; an even number of permanent magnets on one of said members placed so that their poles will define a circular path, the poles of consecutive permanent magnets being alternated so that along the side of said path north poles will lie between south poles; a like number of solenoids mounted on the other of said members so as to lie in said path; conductor means and a source of electrical energy for energizing said solenoids so that the fields of adjacent solenoids will be of opposite polarity; and means for reversing the polarities of said solenoids, comprising a polarity reversing relay connecting said current source with said conductor means, said relay having an energizing circuit including a source of electric energy and drum switch means rotating in timed relation to said rotor member for controlling the flow of current in said energizing circuit.

HAROLD A. ADAMS.

REFERENCES CITED

The following references are of record in the file of this patent:

UNITED STATES PATENTS

| Number | Name | Date |
|---|---|---|
| 129,000 | Camacho | July 16, 1872 |
| 294,719 | Ball | Mar. 4, 1884 |
| 404,533 | Gartner | June 4, 1889 |
| 1,275,665 | Eichbaum | Aug. 13, 1918 |
| 1,859,643 | Worthington | May 24, 1932 |
| 1,863,294 | Bogia | June 14, 1932 |
| 2,279,690 | Lindsey | Apr. 14, 1942 |
| 2,281,081 | Sheldon | Apr. 28, 1942 |
| 2,408,375 | Collins | Oct. 1, 1946 |

FOREIGN PATENTS

| Number | Country | Date |
|---|---|---|
| 18,215 | Australia | of 1929 |